UNITED STATES PATENT OFFICE.

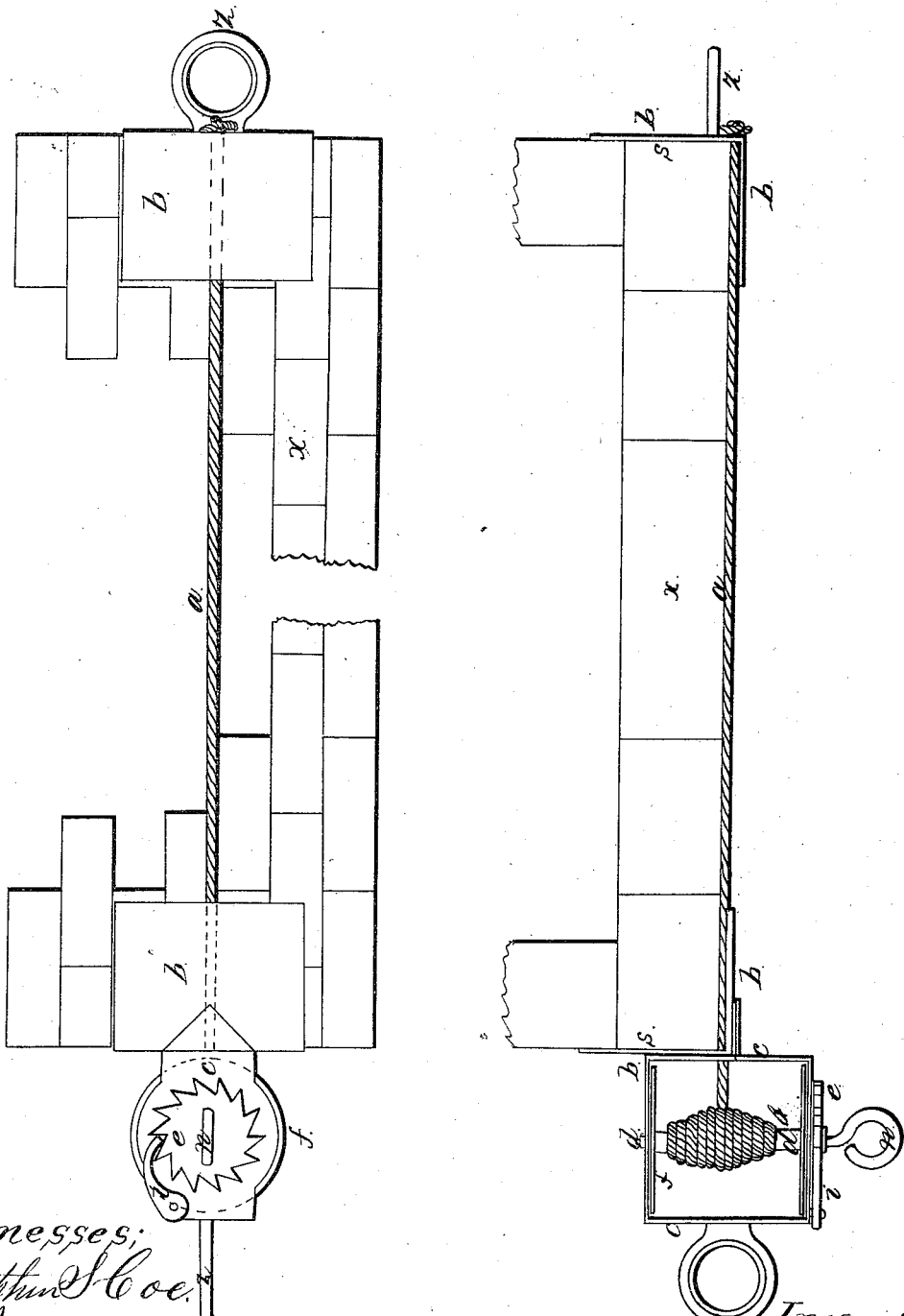

LEONARD A. GREEN, OF ROCKY HILL, CONNECTICUT.

IMPROVEMENT IN LINE-HOLDERS FOR MASON-WORK, &c.

Specification forming part of Letters Patent No. 34,631, dated March 11, 1862.

*To all whom it may concern:*

Be it known that I, LEONARD A. GREEN, of Rocky Hill, county of Hartford, and State of Connecticut, have invented a certain new and useful Improvement in Masons' Line-Holders; and I do hereby declare that the same is described and represented in the following specification and drawing; and to enable others skilled in the art to make and use the same I will proceed to describe its construction and operation, referring to the drawing, in which the same letters indicate like parts.

The nature of this improvement in masons' line-holders consists in combining with the line a proper device for rendering itself sustaining and adjustable without the use of nails, as now commonly used.

In the accompanying drawing, $a$ is the line.

$b\ b$ are brackets, made in proper shape to fit the corner of a building or brick-work in the process of being built up. To one of these brackets is secured a frame $c$, in which is arranged a spool $f$, secured upon a spindle $d$. This spindle $d$ is provided with a ratchet-wheel $e$ close to the side, or nearly so, of the frame $c$.

$i$ is a pawl secured to the frame and works upon the edge and into the teeth of the wheel $e$, which materially aids in adjusting the line and for holding it (the line) when not wanted for use. $n$ is a thumb-piece or handle for operating the spool.

$r\ r$ are handles for handling and adjusting the device into place. $s$ are friction-pads secured to the inside of the brackets, which I propose to use sometimes for the purpose of more effectually securing the brackets from slipping.

In using this improvement the line is drawn out from the spool the desired length, and the angle-brackets $b$ are placed on the corner of the work (see $x$) and the line tightened up, as required, and moved upward successively as each tier of bricks or other materials are laid, thus avoiding the common, irksome, and extra laborious work of, first, securing nails in the joints to fasten the line, and, second, of pointing up the holes thus made afterward.

This improvement may be used to great advantage without the spool device; but it is believed it will be found to be more convenient and give better satisfaction when the spool is used with the brackets.

I have endeavored to show the nature, construction, operation, and advantage to be derived by this improvement to enable a person skilled to make and use the same.

What I claim, therefore, and desire to secure by Letters Patent, is—

1. The employment of the brackets $b\ b$, combined with line $a$ for holding and easily adjusting it (the line) in its proper place.

2. The pad $s$, brackets $b\ b$, and line, combined as and for the purpose described.

3. The combination of the ratchet $e$, spool $f$, brackets $b\ b$, and line $a$, substantially as and for the purpose described.

LEONARD A. GREEN. [L. S.]

Witnesses:
STEPHEN S. COE,
JEREMY W. BLISS.